(12) United States Patent
Lilley

(10) Patent No.: US 7,120,521 B2
(45) Date of Patent: Oct. 10, 2006

(54) ANTI HIJACKING FAIL-SAFE SYSTEM WITH ALERT LOCATOR TRACKING CAPABILITIES

(76) Inventor: Hal Dwayne Lilley, 8323 Ox Bow Rd., North East, PA (US) 16428

( * ) Notice: Subject to any disclaimer, the term of this patent is extended or adjusted under 35 U.S.C. 154(b) by 0 days.

(21) Appl. No.: 10/768,775

(22) Filed: Feb. 2, 2004

(65) Prior Publication Data

US 2004/0243286 A1 Dec. 2, 2004

Related U.S. Application Data

(60) Provisional application No. 60/443,875, filed on Jan. 31, 2003.

(51) Int. Cl.
*H04B 7/00* (2006.01)
*G08G 5/00* (2006.01)

(52) U.S. Cl. .............. 701/3; 244/189; 340/945

(58) Field of Classification Search ............ 701/3, 701/213, 207; 244/189; 340/945, 426.21, 340/425.5, 426.13, 539.1, 539.13, 426.12, 340/5.22, 5.31, 5.54; 180/287; 307/10.2
See application file for complete search history.

(56) References Cited

U.S. PATENT DOCUMENTS

| 5,463,372 | A  | * | 10/1995 | Mawyer, Sr. ............... 340/428 |
|---|---|---|---|---|
| 6,262,656 | B1 | * | 7/2001  | Byrd et al. ............ 340/426.21 |
| 6,658,572 | B1 | * | 12/2003 | Craig ........................ 726/16 |
| 6,735,521 | B1 | * | 5/2004  | Roux ........................ 701/213 |
| 6,739,556 | B1 | * | 5/2004  | Langston ................... 244/189 |
| 2003/0052798 | A1 | * | 3/2003  | Hanson ...................... 340/945 |
| 2003/0222758 | A1 | * | 12/2003 | Willats et al. ............ 340/5.72 |
| 2004/0056770 | A1 | * | 3/2004  | Metcalf ..................... 340/574 |

* cited by examiner

*Primary Examiner*—Dalena Tran
(74) *Attorney, Agent, or Firm*—Carothers and Carothers

(57) ABSTRACT

The Anti Hijacking Fail-safe System with Alert Locator Tracking Capabilities is a tamper-proof computer hardware/software system that could be installed in a commercial aircraft that, in case of an emergency, could be irreversibly engaged by the pilot, or by remote control, to take complete control of all necessary navigation and flight controls. It will then identify and select a predetermined, suitable airport. After this selection is made, the system will then vector the aircraft to the selected airport. After considering many factors, the system will engage an auto-land system. The auto-land system will take the aircraft to a safe landing, full stop, and shut down. The system could then be pre programmed with several other emergency functions, specific to the aircraft in which it is installed.

2 Claims, No Drawings

ANTI HIJACKING FAIL-SAFE SYSTEM WITH ALERT LOCATOR TRACKING CAPABILITIES

This application claims benefit of Provisional Application No. 60/443,875 filed on Jan. 31, 2003

This invention will completely eliminate the possibility of an aircraft being hijacked and used as a weapon of mass destruction.

BACKGROUND OF THE INVENTION

In the 21st century, commercial passenger and cargo airliners are still very susceptible to being hijacked and used as weapons of mass destruction, such as the events that occurred on Sep. 11, 2001. These same aircraft are also very susceptible to being stolen, with no way of locating them. An aircraft such as the Boeing 747 that was stolen during the summer of 2003 in Africa has still not been found to this date. This stolen aircraft could be loaded with high grade explosives and flown at low altitudes, virtually undetectable, toward the United States. With present radar systems and others, this aircraft could reach a major U.S. coastal city before it is detected, leaving us no time to defend ourselves or disable the aircraft. These examples, and many more situations can be resolved with the use of this invention, the Anti Hijacking Fail-safe System with Alert Locator Tracking Capabilities.

BRIEF SUMMARY OF THE INVENTION

The Anti Hijacking Fail-safe System with Alert Locator Tracking Capabilities is a tamper-proof computer hardware/software package that, once engaged, will irreversibly take complete control of an aircraft and bring it to a safe landing. This would prevent a successful hijacking/unauthorized use of an aircraft to be used as a weapon of mass destruction, or other terrorist acts.

DETAILED DESCRIPTION OF THE INVENTION

The Anti Hijacking Fail-safe System with Alert Locator Tracking Capabilities is a tamper-proof computer hardware/software package that will prevent successful hijackings when linked with other systems already in use with commercial airliners. This package would include a control center that would be armed after going through a CQ check during pre-flight by the captain, through the use of, but, not limited to, a key or key pad on the panic button box. This CQ check connection with the system would insure that the Anti Hijacking Fail-safe System with Alert Locator Tracking Capabilities had not been tampered with during maintenance or other servicing. This same control center would also contain the panic button, that would be used to initiate the Anti Hijacking Fail-safe System with Alert Locator Tracking Capabilities' engagement. This control center would be ergonomically located so the captain would have immediate access to the panic button, but also located in such a place that it would not likely be accidentally engaged. Once initiated and irreversibly engaged, The Anti Hijacking Fail-safe System with Alert Locator Tracking Capabilities would put the aircraft on auto-pilot. The next step the Anti Hijacking Fail-safe System with Alert Locator Tracking Capabilities could take would be to send out a specific and predetermined mayday to all air traffic control centers that it is in contact with, or will be, in its present course and heading, and/or control centers that it will be utilizing after a new course is set. The system could then select a suitable airport for landing the aircraft based on many criteria. This criteria would include, but is not limited to; remaining fuel on board; flight time, distance, and glide path to nearest airport: airport's ability to handle emergencies by rating. All of these factors would be assessed by the on board computer's software package. This software package could be changed or updated to have this information on airport suitability readily available along its normal route, and alternate routes. After selecting the most suitable airport, the Anti Hijacking Fail-safe System with Alert Locator Tracking Capabilities would then send a radio transmission to this airport, stating its intentions. The Anti Hijacking Fail-safe System with Alert Locator Tracking Capabilities would then program an auto-land system with information from the selected landing airport, such as wind direction and weather conditions. After programming the auto-land system with all of the necessary information, it would irreversibly engage the auto-land system. Once the aircraft has landed and the auto-land system has disconnected, the Anti Hijacking Fail-safe System with Alert Locator Tracking Capabilities could immediately and irreversibly shut down the entire aircraft, including engines, and take other emergency measures that it has been programmed with to be aircraft specific. In an emergency, it would be at the pilot's or command center's discretion to engage the Anti Hijacking Fail-safe System with Alert Locator Tracking Capabilities. Once the Anti Hijacking Fail-safe System with Alert Locator Tracking Capabilities was engaged by, but not limited to, the pilot, designated crew member, or air traffic control, it would be irreversible. The Anti Hijacking Fail-safe System with Alert Locator Tracking Capabilities would be installed in such a manner that it would be tamper-proof. The panic button console would be tamper-proof from inside the aircraft, so it could not be disarmed once it has been engaged. The Anti Hijacking Fail-safe System with Alert Locator Tracking Capabilities would also be tamper-proof from outside the aircraft by, but not limited to, one or more of the following—location in the aircraft; impenetrable shielding that, if removed or tampered with, would activate the Alert Locator capability which, using GPS technology, would then notify air traffic control as to the identity and location of the aircraft. The Locator capability of the Anti Hijacking Fail-safe System, which would also incorporate the use of GPS technology, would have the ability of locating any aircraft, any where in the world, by remotely activating this system. This feature would not only greatly aid in search and rescue efforts for downed aircraft, it could also help find stolen aircraft, such as the missing 747 in Africa, that could be used for terrorist activities. The Tracking capability of this Anti Hijacking Fail-safe System could be programmed and utilized in many different ways. One of the primary functions that could be programmed into the Tracking system is that it would automatically turn itself on when the aircraft in which it is installed approaches US air space. The tracking would then continuously identify the aircraft by sending out continuous GPS signals to air traffic control. This would be achieved through the Anti-Hijacking Fail-safe System with Alert Locator Tracking Capabilities computer constantly monitoring its location. Depending on volume of traffic, and the ability of air traffic control centers to monitor said volume, aircraft could be monitored any where in the world, if necessary. Another feature of the Alert Locator Tracking Capabilities is that an air traffic control center would have the capability of listening in to the cockpit and/or cabin activities. After noticing unusual activity from an aircraft, such as a dramatic change in altitude or scheduled flight path, and after listening in to the cockpit and/or cabin, if it was determined by the air traffic controller that there was an emergency on board and could not get a response from the aircraft personnel explaining that they had their emergency under control, the air traffic controller would have the capability of activating the Anti Hijacking Fail-safe System to bring the aircraft to a safe landing. No one, including but not limited to, the pilot, crew, passengers, or air traffic controller would be capable of regaining control of the aircraft until the Anti Hijacking Fail-safe System with Alert Locator Tracking Capabilities' sequence of processes had been completed. The use of the Anti Hijacking Fail-safe System with Alert Locator Tracking Capabilities would completely eliminate the hijacker's bargaining power and control of the aircraft.

The invention claimed is:

1. A computer system for commercial aircraft which is linked to the on-board global positioning system by utilizing information therefrom, the computer being programmed to send out to air traffic control a signal which automatically turns on when entering United States air space thereby identifying the specific aircraft and continuously sending out a signal to air traffic control reporting the aircraft's position.

2. The computer system of claim 1, wherein said computer turns on said signal by remote control activation instead of automatically.

* * * * *